United States Patent

Wakamoto

[11] Patent Number: 6,079,203
[45] Date of Patent: Jun. 27, 2000

[54] APPARATUS AND METHOD FOR DETECTING DETERIORATION OF $NO_x$ CATALYST IN DIESEL ENGINE

[75] Inventor: Koutarou Wakamoto, Oyama, Japan

[73] Assignee: Komatsu Ltd., Tokyo, Japan

[21] Appl. No.: 09/051,160

[22] PCT Filed: Oct. 1, 1996

[86] PCT No.: PCT/JP96/02857

§ 371 Date: Apr. 2, 1998

§ 102(e) Date: Apr. 2, 1998

[87] PCT Pub. No.: WO97/13058

PCT Pub. Date: Apr. 10, 1997

[30] Foreign Application Priority Data

Oct. 2, 1995 [JP] Japan ..................... 7-278350

[51] Int. Cl.[7] .................................... F01N 3/00
[52] U.S. Cl. ............... 60/274; 60/276; 60/277; 60/286; 60/301
[58] Field of Search ............... 60/276, 274, 286, 60/277, 301, 303

[56] References Cited

U.S. PATENT DOCUMENTS

| | | | |
|---|---|---|---|
| 5,201,802 | 4/1993 | Hirota et al. | 60/276 |
| 5,433,074 | 7/1995 | Seto et al. | 60/301 |
| 5,584,176 | 12/1996 | Meyer et al. | 60/277 |

FOREIGN PATENT DOCUMENTS

| | | |
|---|---|---|
| 4-109021 | 4/1992 | Japan . |
| 4-330314 | 11/1992 | Japan . |
| 5-195756 | 8/1993 | Japan . |
| 5-312024 | 11/1993 | Japan . |
| 7-279651 | 10/1995 | Japan . |
| 8-61047 | 3/1996 | Japan . |

Primary Examiner—Thomas E. Denion
Attorney, Agent, or Firm—Sidley & Austin

[57] ABSTRACT

An apparatus and a method for accurately detecting a degradation in the performance of an $NO_x$ catalyst which is used to reduce $NO_x$ exhausted from a diesel engine. Thus an apparatus for detecting a deterioration of an $NO_x$ catalyst for a diesel engine in which hydrocarbons for reduction are supplied into an exhaust pipe and the exhausted $NO_x$ is reduced and purified by the $NO_x$ catalyst, includes a rotational speed sensor (4) for the diesel engine (1), a load sensor (5) for the diesel engine (1), a hydrocarbon sensor (11) provided downstream of the $NO_x$ catalyst (3) for detecting an amount of hydrocarbons in the exhaust gas, and deterioration detecting means (12) for detecting an operating condition of the diesel engine (1) on the basis of signals from the rotational speed sensor (4) and the load sensor (5), and for determining the deterioration of the $NO_x$ catalyst (3) on the basis of a change in the amount of hydrocarbons in the exhaust gas during a period of time when the operating condition meets a predetermined condition. When a deterioration of the $NO_x$ catalyst (3) is detected, it is also possible to add an increased amount of a reducer fuel.

16 Claims, 7 Drawing Sheets

APPARATUS AND METHOD FOR DETECTING DETERIORATION OF $NO_x$ CATALYST IN DIESEL ENGINE

TECHNICAL FIELD

The present invention relates to an apparatus and a method for accurately detecting a degradation in the performance of an $NO_x$ catalyst which is used to reduce $NO_x$ exhausted from a diesel engine.

BACKGROUND ART

Hitherto, the Unexamined Japanese Patent Publication No. 330314/1992 described a catalytic converter for reducing and decomposing $NO_x$ contained in exhaust gas from a diesel engine. According to that document, a catalytic converter comprises an $NO_x$ catalyst of copper-zeolite, disposed in an exhaust path from a diesel engine; a hydrocarbon sensor, disposed in the exhaust path on the upstream side of the $NO_x$ catalyst, for detecting a concentration of the hydrocarbons in the exhaust gas; and a hydrocarbon fuel injecting means, disposed in the exhaust path upstream of the hydrocarbon sensor, for injecting the fuel into the exhaust path in accordance with the detection by the hydrocarbon sensor in order to keep the concentration of hydrocarbons in the exhaust gas within a predetermined range.

By this construction, a suitable amount of the fuel is injected into the exhaust path by the fuel injecting means in accordance with the detected value of the concentration of hydrocarbons in the exhaust gas so as to keep the concentration of hydrocarbons in the exhaust gas within a predetermined range. The fuel, injected by the fuel injecting means, acts as a reducer of the hydrocarbons and activates the $NO_x$ catalyst of copper-zeolite in cooperation with oxygen contained in the exhaust gas from the diesel engine. As a result, it accelerates the reduction of $NO_x$ in the exhaust gas.

In that document, however, the hydrocarbon sensor is disposed on the upstream side of the $NO_x$ catalyst and the fuel is injected by the fuel injecting means in accordance with the detected value from the hydrocarbon sensor in order to keep the concentration of hydrocarbons within a predetermined range. In this construction, the $NO_x$ in the exhaust gas is properly reduced, but the $NO_x$ catalyst in use deteriorates with the lapse of time to lower its performance of purifying $NO_x$.

In general, the $NO_x$ purifying performance of an $NO_x$ catalyst is improved by increasing the additive amount of reducer hydrocarbons. Therefore, when the $NO_x$ catalyst deteriorates, it is necessary to correctively increase the additive amount of reducer hydrocarbons, in accordance with the deterioration of the $NO_x$ catalyst, for keeping the exhausted $NO_x$ concentration below a predetermined level. This operation requires an accurate detection of the degradation in the performance of an $NO_x$ catalyst. Although it is desired to develop an optimum apparatus and an optimum method for this purpose, they have not yet been realized.

SUMMARY OF INVENTION

It is an object of the present invention to provide an apparatus and a method for accurately detecting a degradation in the performance of an $NO_x$ catalyst which is used to reduce the $NO_x$ exhausted from a diesel engine.

An apparatus for detecting a deterioration of an $NO_x$ catalyst for a diesel engine according to the first aspect of the present invention, in which a hydrocarbon fuel such as kerosene is supplied into an exhaust pipe as hydrocarbons for reduction, and the exhausted $NO_x$ is reduced and purified by the $NO_x$ catalyst disposed in the exhaust pipe, comprises: a rotational speed sensor, for measuring the rotational speed of the diesel engine; a load sensor, for detecting a load on the diesel engine; a hydrocarbon sensor, provided downstream of the $NO_x$ catalyst, for detecting an amount of hydrocarbons in the exhaust gas from the $NO_x$ catalyst; and deterioration detecting means, for detecting an operating condition of the diesel engine on the basis of signals from the rotational speed sensor and the load sensor, and for determining the extent of the deterioration of the $NO_x$ catalyst on the basis of a change in the amount of hydrocarbons in the exhaust gas from the $NO_x$ catalyst during a period of time when the operating condition meets a predetermined condition.

An apparatus for detecting a deterioration of an $NO_x$ catalyst for a diesel engine according to the second aspect of the present invention, in which a fuel such as kerosene is supplied into an exhaust pipe as hydrocarbons for reduction, and the exhausted $NO_x$ is reduced and purified by the $NO_x$ catalyst disposed in the exhaust pipe, comprises: a rotational speed sensor, for measuring rotational speed of the diesel engine; a load sensor, for detecting a load on the diesel engine; a hydrocarbon sensor, provided downstream of the $NO_x$ catalyst; and $NO_x$ catalyst deterioration detecting means, for detecting an operating condition of the diesel engine on the basis of signals from the rotational speed sensor and the load sensor, for calculating an amount of hydrocarbons exhausted from the $NO_x$ catalyst, determined from the operating condition at the time when a variation of the operating condition is judged to be held within a predetermined range over a predetermined time, and for comparing the calculated amount of hydrocarbons with an amount of hydrocarbons detected by the hydrocarbon sensor, to determine the extent of the deterioration of the $NO_x$ catalyst.

An apparatus for detecting a deterioration of an $NO_x$ catalyst for a diesel engine according to the third aspect of the present invention, in which a fuel such as kerosene is supplied into an exhaust pipe as hydrocarbons for reduction, and the exhausted $NO_x$ is reduced and purified by the $NO_x$ catalyst disposed in the exhaust pipe, comprises: a rotational speed sensor, for measuring rotational speeds of the diesel engine; a load sensor, for detecting a load on the diesel engine; an oxidation catalyst, disposed in the exhaust pipe downstream of and at a predetermined distance from the $NO_x$ catalyst; a temperature sensor upstream of the oxidation catalyst and disposed between the $NO_x$ catalyst and the oxidation catalyst; a temperature sensor on the downstream side of the oxidation catalyst and disposed downstream from the oxidation catalyst; and deterioration detecting means, for detecting an operating condition of the diesel engine on the basis of signals from the rotational speed sensor and the load sensor, and for determining the extent of the deterioration of the $NO_x$ catalyst on the basis of a change in the difference between the temperatures according to signals from both temperature sensors during a period of time when the operating condition meets a predetermined condition.

An apparatus for detecting a deterioration of an $NO_x$ catalyst for a diesel engine according to the fourth aspect of the present invention, in which a fuel such as kerosene is supplied into an exhaust pipe as hydrocarbons for reduction, and the exhausted $NO_x$ is reduced and purified by the $NO_x$ catalyst disposed in the exhaust pipe, comprises: a rotational speed sensor, for measuring the rotational speed of the diesel engine; a load sensor, for detecting a load on the diesel engine; an oxidation catalyst, disposed in the exhaust pipe downstream of and at a predetermined distance from the $NO_x$ catalyst; a temperature sensor upstream of the oxidation catalyst and disposed between the $NO_x$ catalyst and the oxidation catalyst; a temperature sensor on the downstream side of the oxidation catalyst and disposed downstream from the oxidation catalyst; and deterioration detecting means, for detecting an operating condition of the diesel engine on the basis of signals from the rotational speed sensor and the load sensor, for calculating the difference between the temperatures of both temperature sensors determined from the operating condition of the diesel engine at a time when a variation of the operating condition is judged to be held within a predetermined range over a predetermined time, and for comparing the calculated difference between the temperatures with the actual difference between the temperatures to determine the extent of the deterioration of the $NO_x$ catalyst.

In an apparatus for detecting a deterioration according to the fifth aspect of the present invention, which is mainly composed of any of the first to fourth aspects, the deterioration detecting means outputs an instruction to increase the additive amount of a reducer fuel supplied to the $NO_x$ catalyst through a reducer fuel supplying nozzle, provided in the exhaust pipe at a location between the diesel engine and the $NO_x$ catalyst, when detecting a deterioration of the $NO_x$ catalyst.

A method of detecting a deterioration of an $NO_x$ catalyst for a diesel engine according to the first aspect of the present invention, in which a fuel such as kerosene is supplied into an exhaust pipe as hydrocarbons for reduction, and the exhausted $NO_x$ is reduced and purified by the $NO_x$ catalyst disposed in the exhaust pipe, comprises: detecting an operating condition of the diesel engine, on the basis of the rotational speed of the diesel engine and a load on the diesel engine; and determining the extent of the deterioration of the $NO_x$ catalyst, on the basis of a change in the amount of hydrocarbons in the exhaust gas from the $NO_x$ catalyst during a period of time when the operating condition meets a predetermined condition.

A method of detecting a deterioration of an $NO_x$ catalyst for a diesel engine according to the second aspect of the present invention, in which a fuel such as kerosene is supplied into an exhaust pipe as hydrocarbons for reduction, and the exhausted $NO_x$ is reduced and purified by the $NO_x$ catalyst disposed in the exhaust pipe, comprises: detecting an operating condition of the diesel engine, on the basis of the rotational speed of the diesel engine and a load on the diesel engine; calculating an amount of hydrocarbons exhausted from the $NO_x$ catalyst, determined from the operating condition of the diesel engine at the time when a variation of the operating condition is judged to be held within a predetermined range over a predetermined time; and comparing the calculated amount of hydrocarbons with the amount of hydrocarbons measured by a hydrocarbon sensor, to determine the extent of the deterioration of the $NO_x$ catalyst.

A method of detecting a deterioration of an $NO_x$ catalyst for a diesel engine according to the third aspect of the present invention, in which a fuel such as kerosene is supplied into an exhaust pipe as hydrocarbons for reduction, and the exhausted $NO_x$ is reduced and purified by the $NO_x$ catalyst disposed in the exhaust pipe, comprises: measuring the temperature on the upstream side and the temperature on the downstream side of an oxidation catalyst, disposed in the exhaust pipe downstream of and at a predetermined distance from the $NO_x$ catalyst; detecting an operating condition of the diesel engine; and determining the extent of the deterioration of the $NO_x$ catalyst, on the basis of a change in the temperature difference during a period of time when the operating condition meets a predetermined condition.

A method of detecting a deterioration of an $NO_x$ catalyst for a diesel engine according to the fourth aspect of the present invention, in which a fuel such as kerosene is supplied into an exhaust pipe as hydrocarbons for reduction, and the exhausted $NO_x$ is reduced and purified by the $NO_x$ catalyst disposed in the exhaust pipe, comprises: measuring the temperature on the upstream side and the temperature on the downstream side of an oxidation catalyst, disposed in the exhaust pipe downstream of and at a predetermined distance from the $NO_x$ catalyst; detecting an operating condition of the diesel engine; calculating the temperature difference between the upstream side and the downstream side of the oxidation catalyst, determined from the operating condition of the diesel engine at the time when a variation of the operating condition is judged to be held within a predetermined range over a predetermined time; and comparing the calculated temperature difference with the actual temperature difference to determine the extent of the deterioration of the $NO_x$ catalyst.

A method of detecting a deterioration according to the fifth aspect of the present invention, which is mainly composed of any of the first to fourth aspects, further comprises increasing the additive amount of a reducer fuel, supplied to the $NO_x$ catalyst through a reducer fuel supplying nozzle provided in the exhaust pipe between the diesel engine and the $NO_x$ catalyst, when detecting a deterioration of the $NO_x$ catalyst.

In these constructions, as the performance of the $NO_x$ catalyst lowers, its performance to oxidize the hydrocarbons deteriorates, so unreacted hydrocarbons are exhausted from the $NO_x$ catalyst.

In the first aspects of the apparatus and method, the amount of exhausted hydrocarbons is determined during a period of time when a diesel engine meets a predetermined condition, so that a degradation in the performance of an $NO_x$ catalyst is accurately ascertained.

In the second aspects of the apparatus and method, a calculation is performed for obtaining the amount of hydrocarbons exhausted from an $NO_x$ catalyst, determined from the operating condition at the time when a variation of the operating condition is judged to be held within a predetermined range, and the calculated amount of hydrocarbons is compared with an actually measured amount of hydrocarbons so that the degradation in the performance of the $NO_x$ catalyst is accurately determined.

When an oxidation catalyst is disposed in an exhaust pipe downstream of the $NO_x$ catalyst, a catalytic combustion of unreacted hydrocarbons in the exhaust gas on the oxidation catalyst brings about a difference between temperatures on the upstream side and the downstream side of the oxidation catalyst. Since the difference between the temperatures correlates with the amount of hydrocarbons when the operating condition of the diesel engine is fixed, the amount of unreacted hydrocarbons exhausted from the $NO_x$ catalyst can be determined to know a deterioration of the $NO_x$ catalyst.

Putting this to use, in the third aspects of the apparatus and method, the difference between the temperatures is determined during a period of time when the diesel engine meets a predetermined condition, so that a degradation in the performance of an $NO_x$ catalyst is accurately ascertained.

In the fourth aspects of the apparatus and method, a calculation is performed for obtaining the difference between temperatures on the upstream side and the downstream side of an oxidation catalyst, determined from the operating condition at the time when a variation of the operating condition is judged to be held within a predetermined range, and the calculated difference between the temperatures is compared with the actual difference between the temperatures so that a degradation in the performance of an $NO_x$ catalyst is accurately ascertained.

In the fifth aspects of the apparatus and method, in any construction of the above first to fourth aspects, an instruction is outputted from the deterioration detecting means to increase the additive amount of a reducer fuel supplied to an $NO_x$ catalyst when detecting a deterioration of the $NO_x$ catalyst. By this construction, even if the remainder of the additive amount of the reducer fuel is small, the amount of hydrocarbons exhausted from the $NO_x$ catalyst can be accurately determined so that a degradation in the performance of the $NO_x$ catalyst is more accurately ascertained.

BEST MODE FOR CARRYING OUT THE INVENTION

An apparatus and a method for detecting the deterioration of an $NO_x$ catalyst for a diesel engine according to an embodiment of the present invention will be described in detail with reference to FIGS. 1 and 2.

Figure 1:
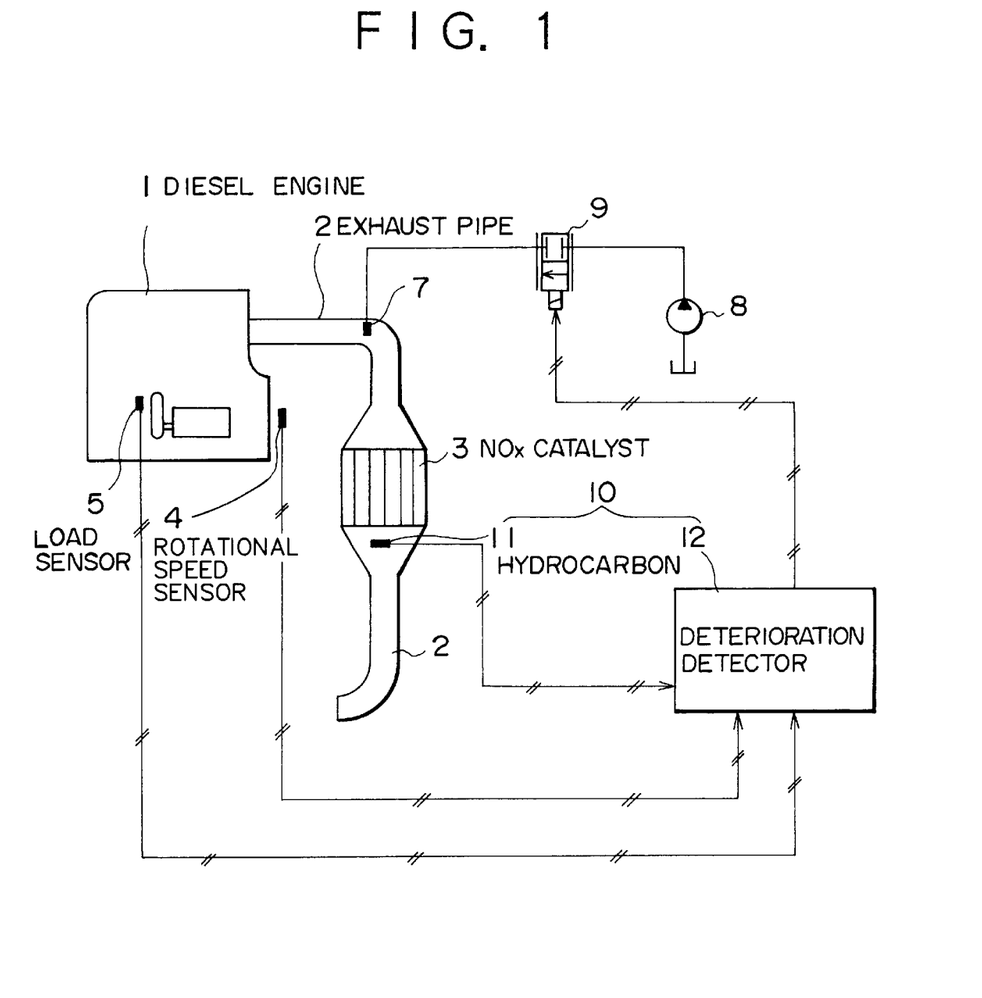
FIG. 1 is an illustration of the construction of an apparatus for detecting the deterioration of an $NO_x$ catalyst for a diesel engine according to the first embodiment of the present invention.
Figure 2:
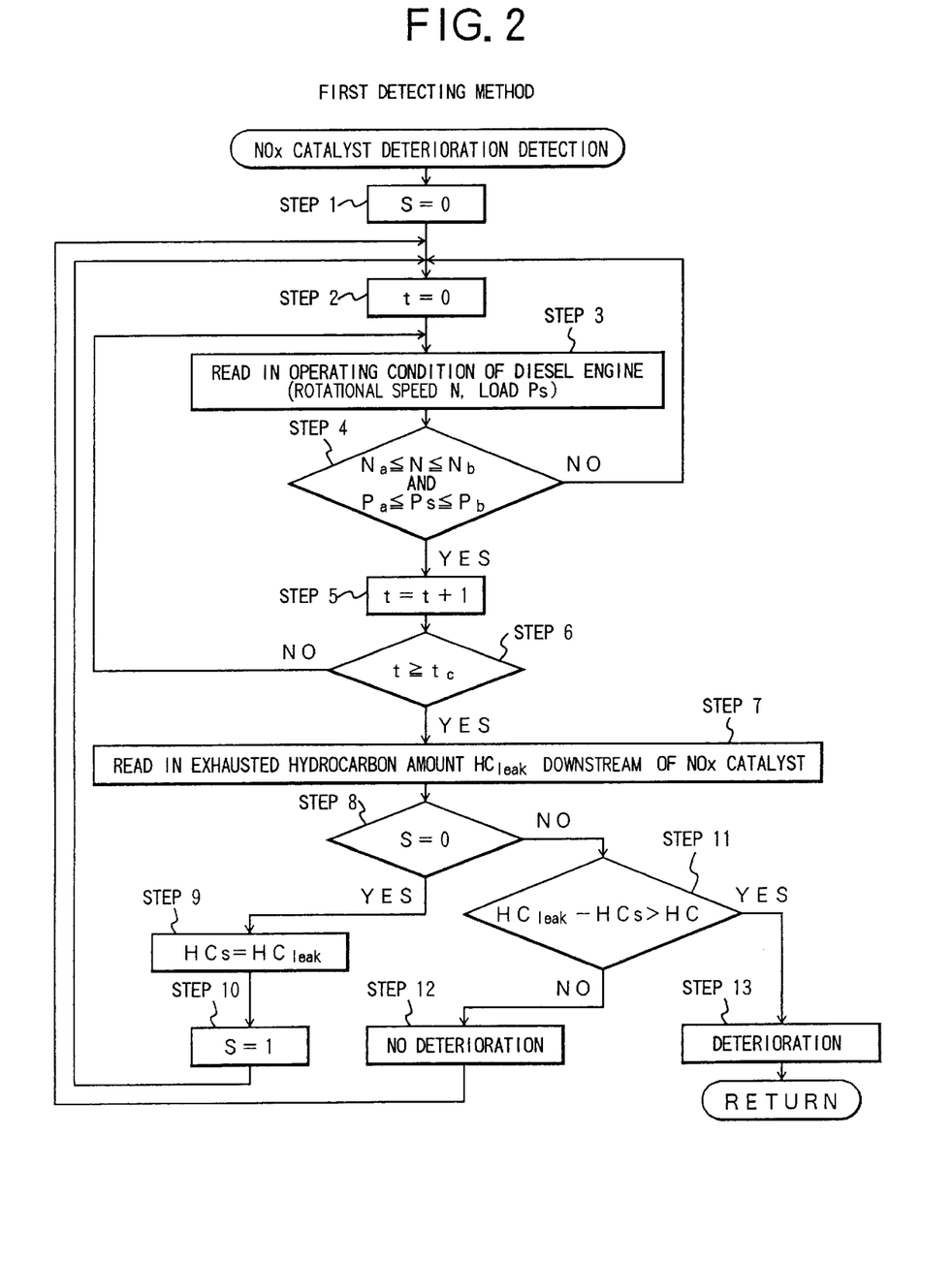
FIG. 2 is a flow chart of a first method of detecting the deterioration of an $NO_x$ catalyst.

In FIG. 1, an exhaust pipe 2 from a diesel engine 1 is provided with an $NO_x$ catalyst 3 for purifying $NO_x$ in the exhaust gas. The diesel engine 1 is equipped with a rotational speed sensor 4 for detecting the rotational speed of the engine, and a load sensor 5, on a lever connected with an accelerator pedal (not shown), for measuring the amount of the injected fuel to detect a load. A reducer fuel adding nozzle 7, for adding the reducer fuel to the exhaust gas, is provided in the exhaust pipe 2 between the diesel engine 1 and the $NO_x$ catalyst 3. The fuel is supplied to the reducer fuel adding nozzle 7 from a pump 8 through a flow control valve 9. The flow control valve 9 is controlled by an instruction from a controller described below in accordance with a use condition of the diesel engine 1 so as to supply a predetermined amount of the reducer fuel to the reducer fuel adding nozzle 7. An $NO_x$ catalyst deterioration detecting unit 10 of this embodiment is provided. The $NO_x$ catalyst deterioration detecting unit 10 comprises a hydrocarbon sensor 11, positioned in the exhaust pipe 2 downstream of the $NO_x$ catalyst, and a deterioration detector 12 as the deterioration detecting means. The deterioration detector 12 includes a controller and receives signals from the rotational speed sensor 4, the injection amount detecting sensor 5, and the hydrocarbon sensor 11 to ascertain a deterioration of the $NO_x$ catalyst 3.

In this construction, the first method of detecting a deterioration of the $NO_x$ catalyst 3 will be described with the flow chart shown in FIG. 2.

In the step 1, a variable S in an equation for calculation (hereinafter, refer to it as variable S) is initially reset to S=0, for establishing a base amount HCs of exhausted hydrocarbons on the downstream side of the $NO_x$ catalyst 3.

In the step 2, the operating duration t is reset to t=0.

In the step 3, an operating condition of the diesel engine 1, on the basis of the rotational speed N of the diesel engine 1 and a load Ps acting on the diesel engine 1 according to signals from the rotational speed sensor 4 and the load sensor 5, is read in the deterioration detector 12.

In the step 4, the deterioration detector 12 judges whether or not the rotational speed N and the load Ps read in are within predetermined ranges. That is, the rotational speed N is judged whether $N_a \leq N \leq N_b$ and the load Ps is judged whether $P_a \leq Ps \leq P_b$.

If the rotational speed N and the load Ps are not within the predetermined ranges in the step 4, the flow returns to the step 2. When the rotational speed N and the load Ps are within the predetermined ranges in the step 4, the flow advances to the step 5.

In the step 5, the rotational speed N and the load Ps are maintained within the predetermined ranges and the successively operating duration (t=t+1) of the diesel engine 1 is measured.

In the step 6, it is judged whether or not the successively operating duration t within the predetermined ranges elapses a predetermined time tc.

If the operating duration t does not elapse the predetermined time tc (t<tc) in the step 6, the flow returns to the step 3. When the operating duration t elapses the predetermined time tc (t>tc) in the step 6, the flow advances to the step 7.

In the step 7, when the diesel engine 1 is operated for the predetermined duration tc at the predetermined conditions so that the reaction on the $NO_x$ is stabilized, the amount $HC_{leak}$ of exhausted hydrocarbons on the downstream side of the $NO_x$ catalyst 3 is read in.

In the step 8, it is judged, with the value of the variable S, whether or not the amount $HC_{leak}$ of the exhausted hydrocarbons on the downstream side of the $NO_x$ catalyst 3 is treated as a base amount HCs of the exhausted hydrocarbons. Since the variable S is reset to S=0 in the step 1, initially S=0. The judgement is thus YES so that the flow advances to the step 9.

In the step 9, the amount $HC_{leak}$ of the exhausted hydrocarbons on the downstream side of the $NO_x$ catalyst 3 is established as the base amount HCs of the exhausted hydrocarbons ($HCs = HC_{leak}$).

In the step 10, the amount $HC_{leak}$ of the exhausted hydrocarbons is stored in the deterioration detector 12 as the base amount HCs of the exhausted hydrocarbons and S is set to S=1. The flow then returns to the step 2.

Next, in the second flow, the operating duration t is reset to t=0 in the step 2.

The steps 3 through 7 are performed similarly to those of the first flow.

Also in the step 8, the judgement is performed with the value of the variable S like the first flow. In the second flow, however, the base amount HCs of the exhausted hydrocarbons on the downstream side of the $NO_x$ catalyst 3 was established and S was already set to S=1 in the step 10. The judgement is thus NO so that the flow advances to the step 11.

In the step 11, it is judged whether or not the amount $HC_{leak}$ of the exhausted hydrocarbons on the downstream side of the $NO_x$ catalyst 3 is more than the base amount HCs of the exhausted hydrocarbons by a predetermined value HC. That is, $HC_{leak}$–HCs>HC is calculated in the deterioration detector 12.

If $HC_{leak}$ is not more than HCs by HC in the step 11 (NO), the flow advances to the step 12, in which the deterioration detector 12 judges it as "no deterioration of the $NO_x$ catalyst 3". The flow then returns to the step 2. When $HC_{leak}$ is more than HCs by HC in the step 11 (YES), the flow advances to the step 13, in which the deterioration detector 12 judges it as "a deterioration of the $NO_x$ catalyst 3". This deterioration detecting routine then comes to an end.

Figure 3:
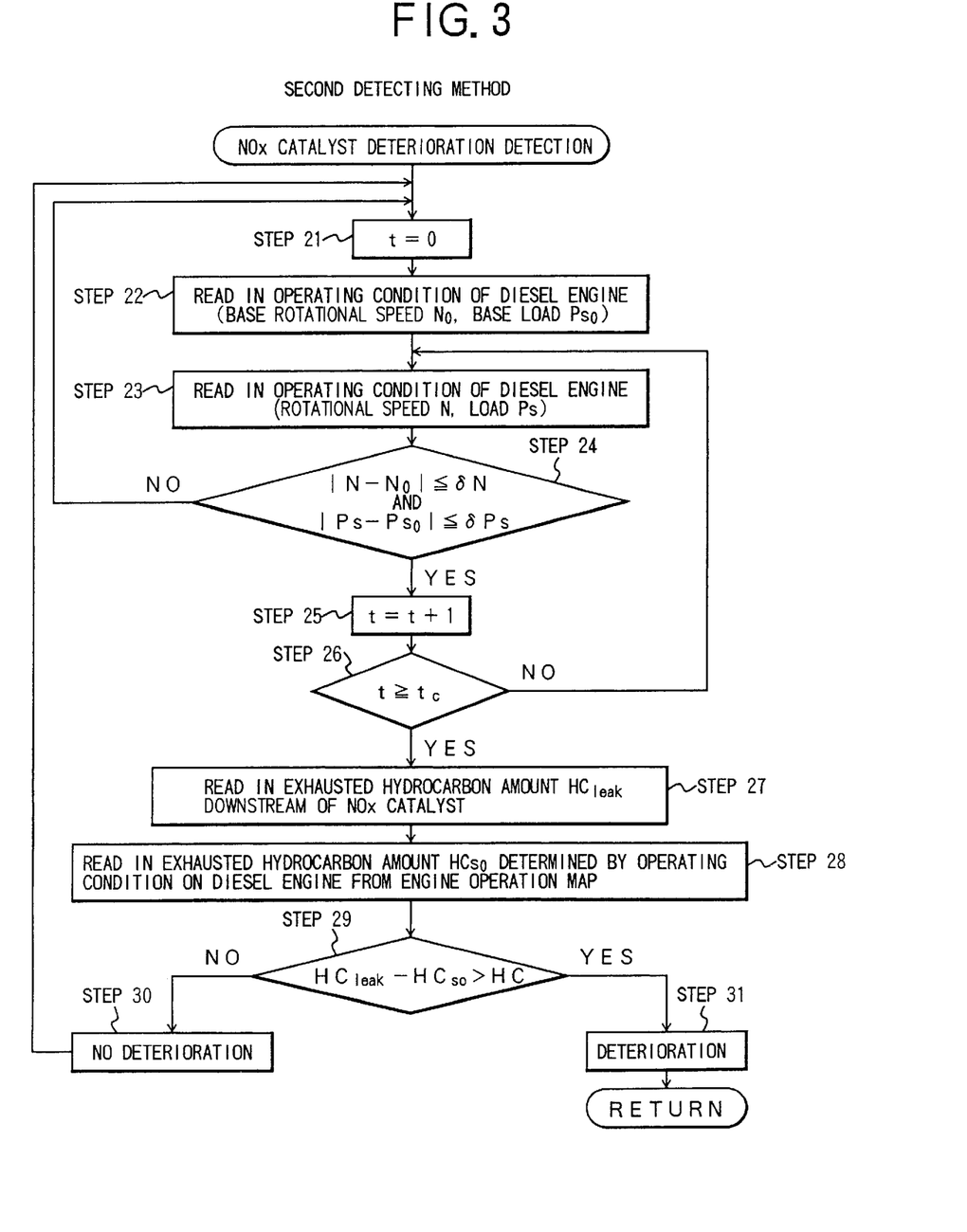
FIG. 3 is a flow chart of a second method of detecting the deterioration of an $NO_x$ catalyst.

Next, the second method of detecting a deterioration of the $NO_x$ catalyst 3 will be described with the flow chart shown in FIG. 3.

In the step 21, the operating duration t is reset to t=0.

In the step 22, base rotational speed No of the diesel engine 1 and a base load $Ps_0$ acting on the engine according to signals from the rotational speed sensor 4 and the load sensor 5 immediately after the operating duration t=0 is inputted to the deterioration detector 12.

In the step 23, an operating condition of rotational speed N of the diesel engine 1 and a load Ps acting on the engine, according to signals from the rotational speed sensor 4 and the load sensor 5, are inputted to the deterioration detector 12.

In the step 24, the deterioration detector 12 judges whether or not the differences δ between the rotational speed N of the diesel engine 1 and the load Ps acting on the engine, read in the step 23, and the base rotational speed $N_0$ of the diesel engine 1 and the base load $Ps_0$ acting on the engine, read in the step 22, are within predetermined ranges, respectively. That is, the judgement, whether or not the absolute value of the difference ($N-N_0$) in the rotational speed is not more than a predetermined value δN: $|N-N_0|<\delta N$, and the judgement, whether or not the absolute value of the difference ($Ps-Ps_0$) in the load is not more than a predetermined value δPs: $|Ps-Ps_0|\leq\delta Ps$, are performed.

If ($N-N_0$) is more than δN or ($Ps-Ps_0$) is more than δPs in the step 24 (NO), the flow returns to the step 21. When ($N-N_0$) is not more than δN and ($Ps-Ps_0$) is not more than δPs in the step 24 (YES), the flow advances to the step 25.

In the step 25, variations of the rotational speed N of the diesel engine 1 and the load Ps acting on the engine are maintained within the predetermined ranges and the successively operating duration (t=t+1) is measured.

In the step 26, it is judged whether or not the successively operating duration t within the predetermined ranges lasts a predetermined time tc.

If the operating duration t has not lasted the predetermined time tc (t<tc) in the step 26, the flow returns to the step 23. When the operating duration t lasts the predetermined time tc (t≧tc) in the step 26, the flow advances to the step 27.

In the step 27, an amount $HC_{leak}$ of the exhausted hydrocarbons on the downstream side of the $NO_x$ catalyst 3 is read in.

In the step 28, a base amount $HCs_0$ of the exhausted hydrocarbons on the downstream side of the $NO_x$ catalyst 3 at the operating condition of the step 22, that is, at the time of the base rotational speed $N_0$ of the diesel engine 1 and the base load $Ps_0$ acting on the engine are read in from an engine operation map stored in the deterioration detector 12. The engine operation map is a map in which the base amount $HCs_0$ of the exhausted hydrocarbons can be calculated from the rotational speed N on a horizontal axis and the load Ps on a vertical axis.

In the step 29, it is judged whether or not the amount $HC_{leak}$, of the exhausted hydrocarbons actually exhausted on the downstream side of the $NO_x$ catalyst 3, is more than the base amount $HCs_0$, of the exhausted hydrocarbons read in from the engine operation map, by a predetermined value HC or not. That is, $HC_{leak}$–$HCs_0$>HC is calculated in the deterioration detector 12.

If $HC_{leak}$ is not more than $HCs_0$ by HC in the step 29 (NO), the flow advances to the step 30, in which the deterioration detector 12 judges it as "no deterioration of the $NO_x$ catalyst 3". The flow then returns to the step 21. When $HC_{leak}$ is more than $HCs_0$ by HC in the step 29 (YES), the flow advances to the step 31, in which the deterioration detector 12 judges it as "a deterioration of the $NO_x$ catalyst 3". This deterioration detecting routine then comes to an end.

Figure 4:
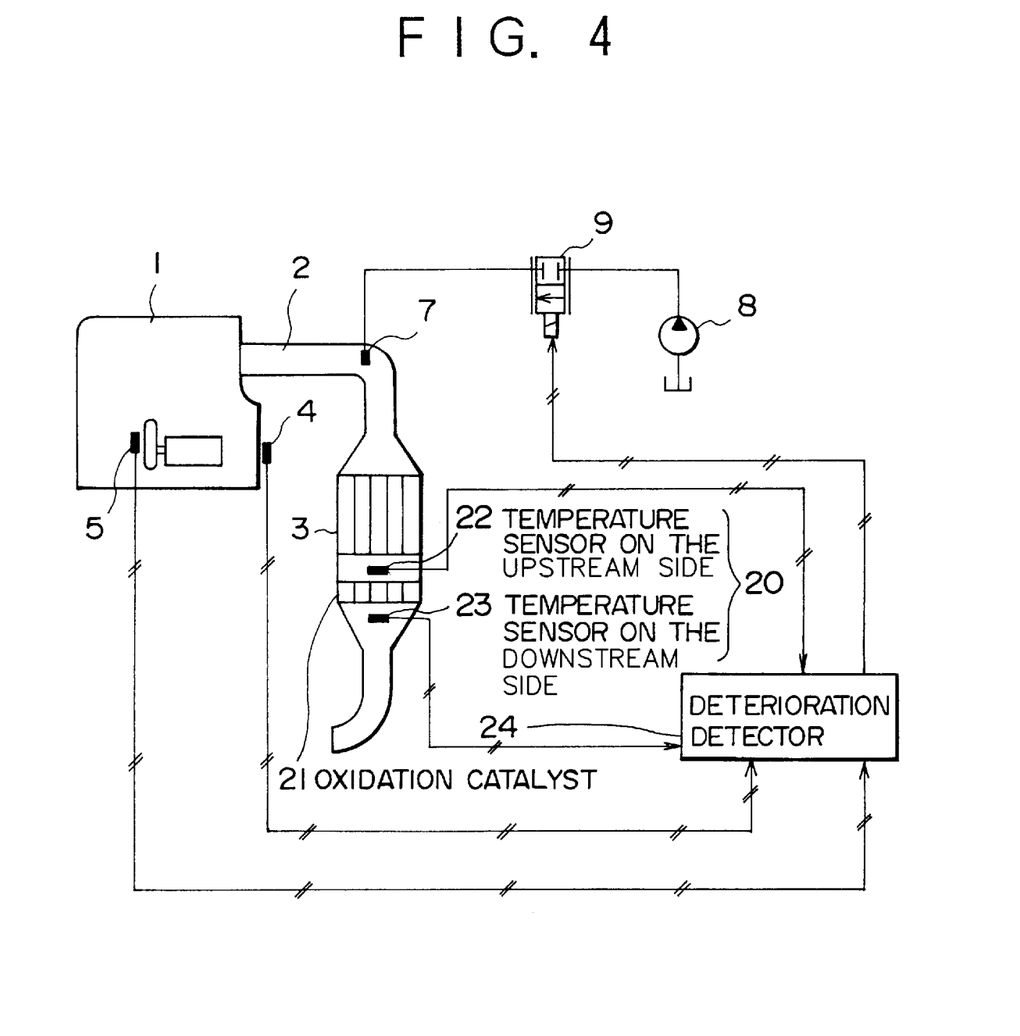
FIG. 4 is an illustration of the construction of an apparatus for detecting the deterioration of an $NO_x$ catalyst for a diesel engine according to the second embodiment of the present invention.

An apparatus for detecting a deterioration of an $NO_x$ catalyst for a diesel engine according to the second embodiment of the present invention will be described with FIG. 4. The same parts as those of the first embodiments are denoted by the same reference numbers as those of the first embodiments and their descriptions are omitted.

An $NO_x$ catalyst deterioration detecting unit 20 comprises: an oxidation catalyst 21, provided in an exhaust pipe 2 on the downstream side of and at a predetermined distance from the $NO_x$ catalyst 3; a temperature sensor 22, upstream of the oxidation catalyst 21 and provided between the $NO_x$ catalyst 3 and the oxidation catalyst 21; a temperature sensor 23, on the downstream side of the oxidation catalyst 21 provided downstream from the oxidation catalyst 21; and a deterioration detector 24 for detecting the difference in temperatures on the basis of signals from both temperature sensors 22 and 23 and for detecting a deterioration of the $NO_x$ catalyst.

Figure 5:
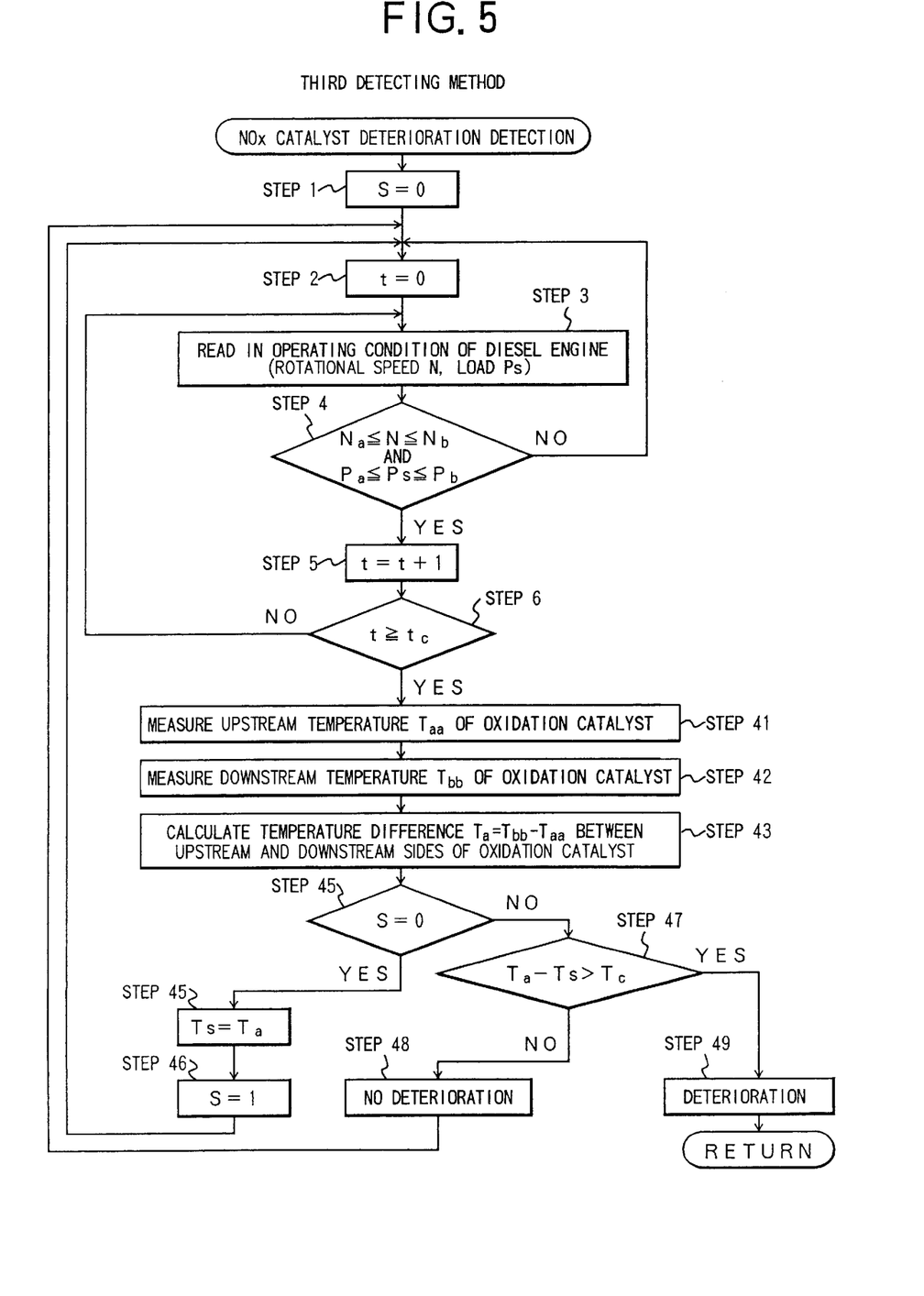
FIG. 5 is a flow chart of a third method of detecting the deterioration of an $NO_x$ catalyst.

In this construction, the third method of detecting a deterioration of the $NO_x$ catalyst 3 will be described with the flow chart shown in FIG. 5. The same steps as those of the first method of detecting a deterioration are denoted by the same step numbers as those of the first detecting method and their descriptions are omitted.

The steps 1 through 6 are performed in the same manners as those of the first detecting method.

In the step 41, the temperature sensor 22 on the upstream side of the oxidation catalyst measures the temperature $T_{aa}$ on the upstream side of the oxidation catalyst 21, (hereinafter, refer to it as upstream temperature $T_{aa}$), and sends the measured value to the deterioration detector 24.

In the step 42, the temperature sensor 23 on the downstream side of the oxidation catalyst 21 measures the temperature $T_{bb}$ on the downstream side of the oxidation catalyst 21 (hereinafter, refer to it as downstream temperature $T_{bb}$), and sends the measured value to the deterioration detector 24.

In the step 43, the temperature difference $T_a$ ($T_a=T_{bb}-T_{aa}$), between the upstream temperature $T_{aa}$ measured in the step 41 and the downstream temperature $T_{bb}$ measured in the step 42, is obtained.

In the step 44, it is judged, with the value of the variable S, whether or not the temperature difference $T_a$, obtained in the step 43, is treated as a base temperature difference Ts. Since the variable S is reset to S=0 in the step 1, initially S=0. The judgement is thus YES, so that the flow advances to the step 45.

In the step 45, the temperature difference $T_a$ obtained is established as the base temperature difference Ts (Ts=$T_a$).

In the step 46, the base temperature difference Ts is stored in the deterioration detector 24 and S is set to S=1. The flow then returns to the step 2.

Next, in the second flow, the operating duration t is reset to t=0 in the step 2. The steps 3 through 43 are performed similarly to those of the first flow.

Also in the step 44, the judgement is performed with the value of the variable S like the first flow. In the second flow, however, the base temperature difference Ts was established and S was already set to S=1 in the step 46. The judgement is thus NO, so that the flow advances to the step 47.

After that, in the step 47, it is judged whether or not the temperature difference Ta, obtained by measuring the temperatures on the upstream and downstream sides of the oxidation catalyst 21, is more than the base temperature difference Ts by a predetermined value $T_c$. That is, $T_a-Ts>T_c$ is calculated in the deterioration detector 24.

If $T_a$ is not more than Ts by $T_c$ in the step 47 (NO), the flow advances to the step 48, in which the deterioration detector 24 judges it as "no deterioration of the $NO_x$ catalyst 3". The flow then returns to the step 2.

When $T_a$ is more than Ts by $T_c$ in the step 47 (YES), the flow advances to the step 49, in which the deterioration detector 24 judges it as "a deterioration of the $NO_x$ catalyst 3". This deterioration detecting routine then comes to an end.

Figure 6:
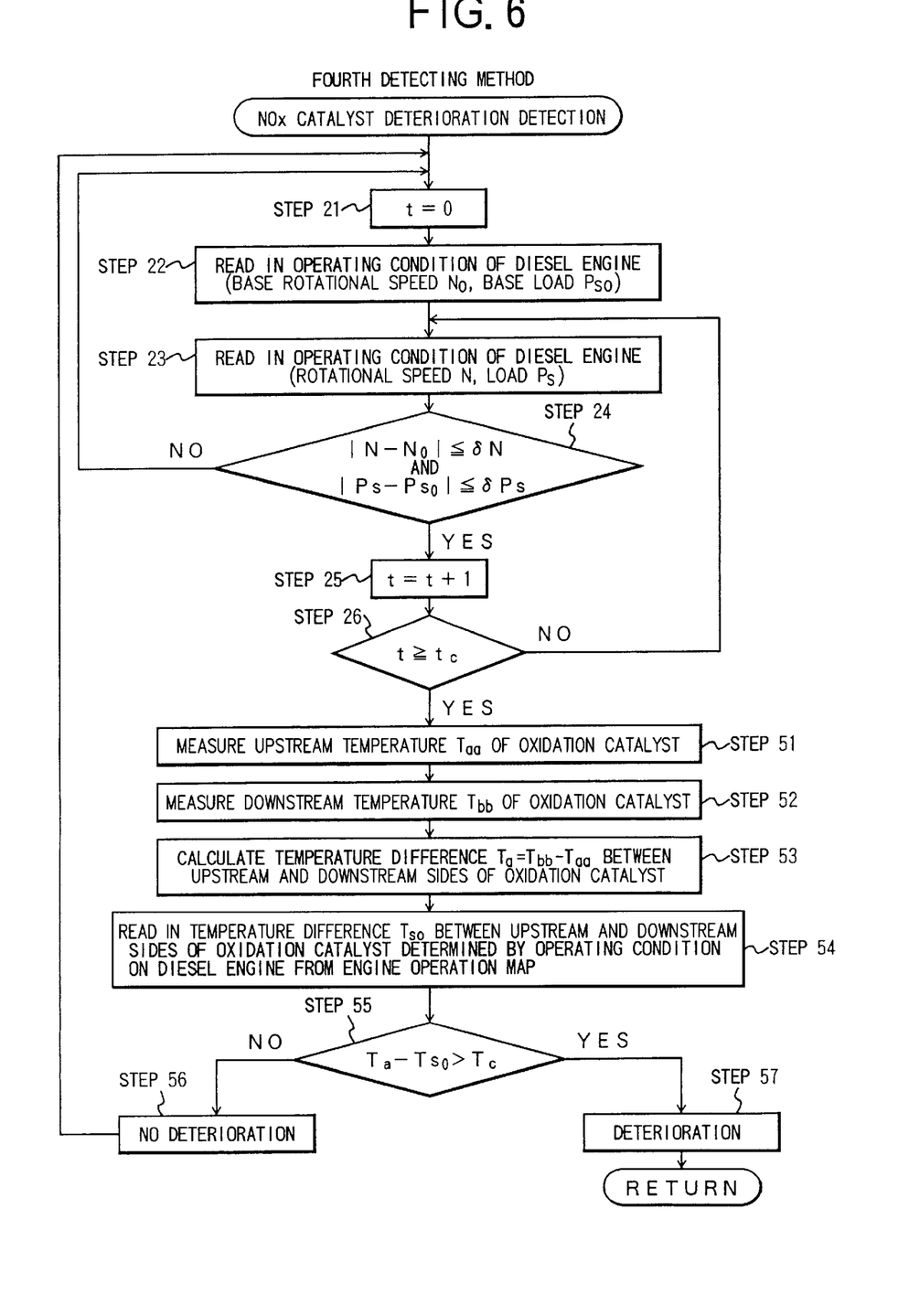
FIG. 6 is a flow chart of a fourth method of detecting the deterioration of an $NO_x$ catalyst.

Next, the fourth method of detecting a deterioration of the $NO_x$ catalyst 3 will be described following the flow chart shown in FIG. 6. The same steps as those of the second method of detecting a deterioration are denoted by the same step numbers as those of the second detecting method and their descriptions are omitted.

The steps 21 through 26 are performed in the same manners as those of the second detecting method.

In the step 51, the temperature sensor 22 on the upstream side of the oxidation catalyst measures the temperature $T_{aa}$ on the upstream side of the oxidation catalyst 21 (hereinafter, refer to it as upstream temperature $T_{aa}$), and sends the measured value to the deterioration detector 24.

In the step 52, the temperature sensor 23 on the downstream side of the oxidation catalyst measures the temperature $T_{bb}$ on the downstream side of the oxidation catalyst 21, and sends the measured value to the deterioration detector 24.

In the step 53, the temperature difference $T_a=T_{bb}-T_{aa}$ between the upstream temperature $T_{aa}$, obtained in the step 51, and the downstream temperature $T_{bb}$, measured in the step 52, is calculated.

In the step 54, a base temperature difference $Ts_0$ between temperatures on the upstream and downstream sides of the oxidation catalyst 21 at the operating condition of the step 22, that is at the time of the base rotational speed $N_0$ o of the diesel engine 1 and the base load $Ps_0$ acting on the engine, is read in from an engine operation map stored in the deterioration detector 12. The engine operation map is a map in which the base temperature difference $Ts_0$ can be calculated from the rotational speed N on a horizontal axis and the load Ps on a vertical axis.

In the step 55, it is judged whether or not the temperature difference $T_a$, actually measured on the upstream and downstream sides of the oxidation catalyst 21, is more than the base temperature difference $Ts_0$, read in from the engine operation map, by a predetermined value $T_c$ or not. That is, $T_a-Ts_0>T_c$ is calculated in the deterioration detector 12.

If $T_a$ is not more than $Ts_0$ by $T_c$ in the step 55 (NO), the flow advances to the step 56, in which the deterioration detector 24 judges it as "no deterioration of the $NO_x$ catalyst 3". The flow then returns to the step 21.

When $T_a$ is more than $Ts_0$ by $T_c$ in the step 55 (YES), the flow advances to the step 57, in which the deterioration detector 24 judges it as "a deterioration of the $NO_x$ catalyst 3". This deterioration detecting routine then comes to an end.

Figure 7:
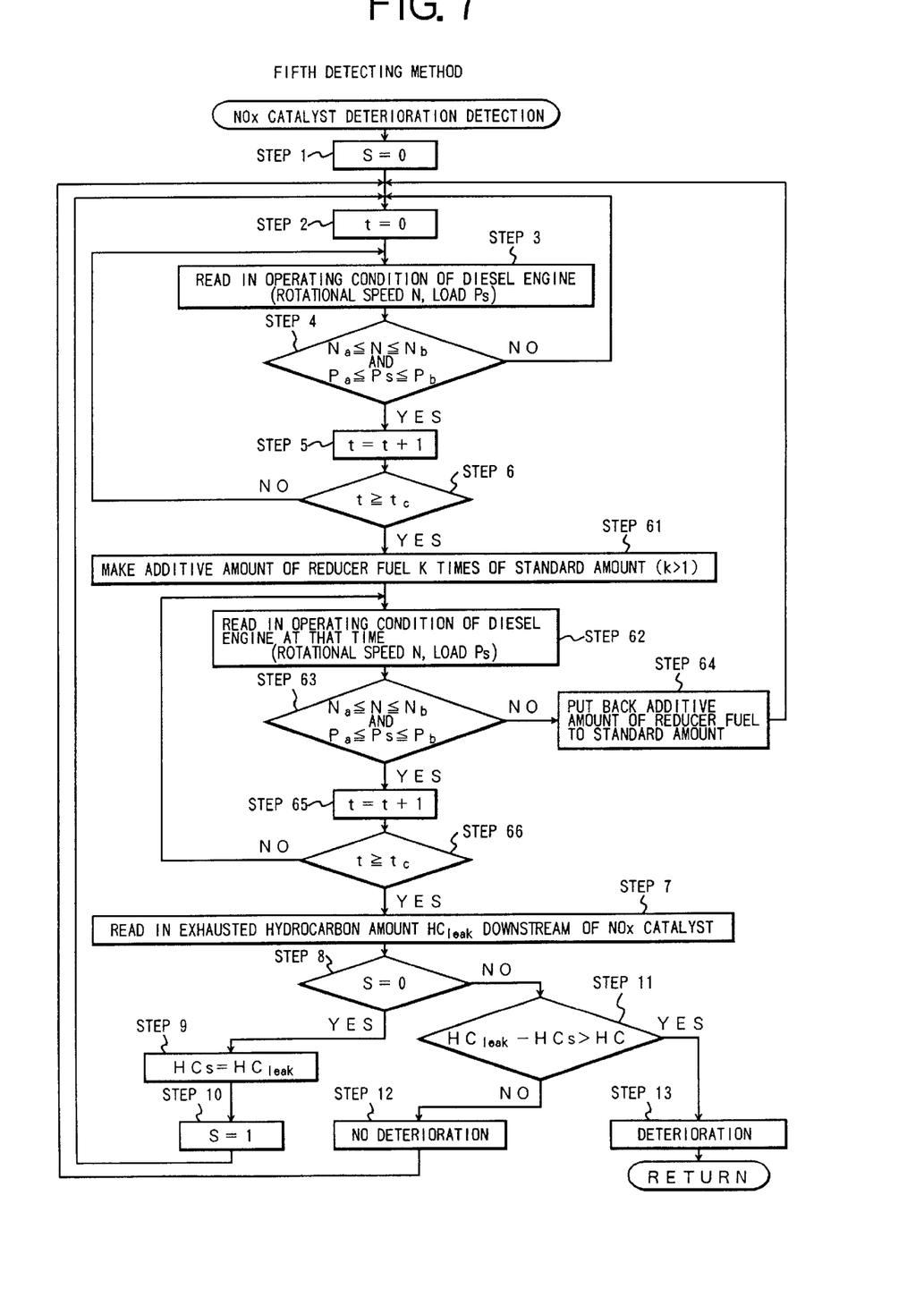
FIG. 7 is a flow chart of a fifth method of detecting the deterioration of an $NO_x$ catalyst.

Next, the fifth method of detecting a deterioration of the $NO_x$ catalyst 3 will be described following the flow chart shown in FIG. 7. The same steps as those of the first method of detecting a deterioration are denoted by the same step numbers as those of the first detecting method and their descriptions are omitted. Here will be described an instance in which this aspect is applied to the first method of detecting a deterioration, but this aspect can be applied to the above second to fourth detecting methods similarly.

Steps 1 through 6 are performed in the same manners as those of the first detecting method.

In the step 61, the deterioration detector 12 outputs an instruction to the flow control valve 9 so that a predetermined additive amount k×q of the reducer fuel, which is more than the additive amount q of the reducer fuel suitable for adding to exhaust gas at the operating condition of the step 3 (by, for instance, k times), is supplied to the $NO_x$ catalyst 3 in the exhaust pipe 2 through the reducer fuel supplying nozzle 7.

In the step 62, the rotational speed N of the diesel engine 1 and the load Ps acting on the engine at that time (at the time when supplying the additive amount k×q of the reducer fuel), according to signals from the rotational speed sensor 4 and the load sensor 5, are read in the deterioration detector 12.

In the step 63, the deterioration detector 12 judges whether or not the read-in rotational speed N of the diesel engine 1 and the read-in load Ps acting on the engine are within predetermined ranges. That is, the rotational speed N is judged whether $N_a \leq N \leq N_b$, and the load Ps is judged whether $P_a \leq P \leq P_b$.

If the rotational speed N and the load Ps are not within the predetermined ranges in the step 63 (NO), the flow advances to the step 64, in which the additive amount k×q of the reducer fuel is put back to the additive amount q of the reducer fuel suitable for the operating condition. The flow then returns to the step 2.

When the rotational speed N and the load Ps are within the predetermined ranges in the step 63 (YES), the flow advances to the step 65.

In the step 65, variations of the rotational speed N and the load Ps are maintained within the predetermined ranges and the successively operating duration (t=t+1) of the diesel engine 1 is measured.

In the step 66, it is judged whether or not the successively operating duration t within the predetermined variations lasts a predetermined time tc.

If the operating duration t does not last the predetermined time tc (t<tc) in the step 66, the flow returns to the step 62. When the operating duration t lasts the predetermined time tc (t≥tc) in the step 66, the flow advances to the step 7, same as that of the first detecting method.

In the step 7, when the reaction on the $NO_x$ catalyst 3 is stabilized at the predetermined conditions, an amount $HC_{leak}$ of the exhausted hydrocarbons on the downstream side of the $NO_x$ catalyst 3 is read in.

Steps 8 through 13 are performed in the same manner as those of the first detecting method.

By this construction, even if the remainder of the additive amount q of the reducer fuel exhausted from the $NO_x$ catalyst 3 is small, by the manner that the additive amount (k×q) of the reducer fuel supplied to the $NO_x$ catalyst 3 through the reducer fuel supplying nozzle 7 is temporarily increased, the amount $HC_{leak}$ of the exhausted hydrocarbons exhausted from the $NO_x$ catalyst 3 can be accurately measured by the hydrocarbon sensor 11 so that a degradation in the performance of the $NO_x$ catalyst is more accurately detected.

INDUSTRIAL APPLICABILITY

The present invention is useful as an apparatus and a method for accurately detecting a degradation in the performance of an $NO_x$ catalyst which is used to reduce $NO_x$ exhausted from a diesel engine. As a result, a revival of the $NO_x$ catalyst can be timely carried out to decrease the exhaust of $NO_x$ gas into the atmosphere.

I claim:

1. An apparatus comprising:

a diesel engine having an exhaust pipe;

$NO_x$ catalyst disposed in the exhaust pipe;

means for supplying hydrocarbons into the exhaust pipe as hydrocarbons for reduction so that $NO_x$ exhausted from said diesel engine can be reduced and purified by the $NO_x$ catalyst disposed in the exhaust pipe;

a rotational speed sensor, for measuring a rotational speed of said diesel engine;

a load sensor, for detecting a load on said diesel engine;

means for determining an amount of hydrocarbons in exhaust gas from said $NO_x$ catalyst; and deterioration detecting means for determining an operating condition of the diesel engine on a basis of signals from the rotational speed sensor and the load sensor, and for determining an extent of deterioration of the $NO_x$ catalyst on a basis of a change in the amount of hydrocarbons in the exhaust gas from the $NO_x$ catalyst during a period of time when the operating condition meets a predetermined condition, wherein said means for determining comprises a hydrocarbon sensor, provided in said exhaust pipe downstream of said $NO_x$ catalyst, and wherein said deterioration detecting means memorizes an amount of hydrocarbons which are exhausted from said $NO_x$ catalyst, initially measured by the hydrocarbon sensor, as a base amount of hydrocarbons, and compares a predetermined value with a difference between the base amount of hydrocarbons and an amount of hydrocarbons subsequently measured by the hydrocarbon sensor to determine the extent of deterioration of the $NO_x$ catalyst.

2. Apparatus in accordance with claim 1, wherein said means for supplying hydrocarbons comprises a reducer fuel supplying nozzle, provided in the exhaust pipe at a location between the diesel engine and the $NO_x$ catalyst; and wherein said deterioration detecting means outputs an instruction to increase an additive amount of a reducer fuel supplied to the $NO_x$ catalyst through said reducer fuel supplying nozzle when detecting deterioration of said $NO_x$ catalyst.

3. An apparatus comprising:

a diesel engine having an exhaust pipe;

$NO_x$ catalyst disposed in the exhaust pipe;

means for supplying hydrocarbons into the exhaust pipe as hydrocarbons for reduction so that $NO_x$ exhausted from said diesel engine can be reduced and purified by the $NO_x$ catalyst disposed in the exhaust pipe;

a rotational speed sensor, for measuring a rotational speed of said diesel engine;

a load sensor, for detecting a load on said diesel engine;

means for determining an amount of hydrocarbons in exhaust gas from said $NO_x$ catalyst; and deterioration detecting means for determining an operating condition of the diesel engine on a basis of signals from the rotational speed sensor and the load sensor, and for determining an extent of deterioration of the $NO_x$ catalyst on a basis of a change in the amount of hydrocarbons in the exhaust gas from the $NO_x$ catalyst during a period of time when the operating condition meets a predetermined condition, wherein said means for determining comprises a hydrocarbon sensor, provided in said exhaust pipe downstream of said $NO_x$ catalyst, and wherein said deterioration detecting means calculates an amount of hydrocarbons exhausted from said $NO_x$ catalyst based on said operating condition at a time when a variation of the operating condition is judged to be held within a predetermined range over a predetermined time, and compares a predetermined value with a difference between thus calculated amount of hydrocarbons and an amount of hydrocarbons measured by the hydrocarbon sensor to determine the extent of deterioration of the $NO_x$ catalyst.

4. Apparatus in accordance with claim 3, wherein said means for supplying hydrocarbons comprises a reducer fuel supplying nozzle, provided in the exhaust pipe at a location between the diesel engine and the $NO_x$ catalyst; and wherein said deterioration detecting means outputs an instruction to increase an additive amount of a reducer fuel supplied to the $NO_x$ catalyst through said reducer fuel supplying nozzle when detecting deterioration of said $NO_x$ catalyst.

5. An apparatus comprising:

a diesel engine having an exhaust pipe;

$NO_x$ catalyst disposed in the exhaust pipe;

means for supplying hydrocarbons into the exhaust pipe as hydrocarbons for reduction so that $NO_x$ exhausted from said diesel engine can be reduced and purified by the $NO_x$ catalyst disposed in the exhaust pipe;

a rotational speed sensor, for measuring a rotational speed of said diesel engine;

a load sensor, for detecting a load on said diesel engine;

means for determining an amount of hydrocarbons in exhaust gas from said $NO_x$ catalyst; and deterioration detecting means for determining an operating condition of the diesel engine on a basis of signals from the rotational speed sensor and the load sensor, and for determining an extent of deterioration of the $NO_x$ catalyst on a basis of a change in the amount of hydrocarbons in the exhaust gas from the $NO_x$ catalyst during a period of time when the operating condition meets a predetermined condition, wherein said means for determining an amount of hydrocarbons in exhaust gas from said $NO_x$ catalyst comprises:

an oxidation catalyst, disposed in the exhaust pipe downstream of and at a predetermined distance from the $NO_x$ catalyst;

a first temperature sensor located in the exhaust pipe upstream of the oxidation catalyst and disposed between the $NO_x$ catalyst and the oxidation catalyst; and a second temperature sensor located in the exhaust pipe downstream of the oxidation catalyst; and wherein said deterioration detecting means determines the extent of deterioration of the $NO_x$ catalyst on a basis of a change in a temperature difference in accordance with signals from the first and second temperature sensors during a period of time when the operating condition meets a predetermined condition.

6. Apparatus in accordance with claim 5, wherein said means for supplying hydrocarbons comprises a reducer fuel supplying nozzle, provided in the exhaust pipe at a location between the diesel engine and the $NO_x$ catalyst; and wherein said deterioration detecting means outputs an instruction to increase an additive amount of a reducer fuel supplied to the $NO_x$ catalyst through said reducer fuel supplying nozzle when detecting deterioration of said $NO_x$ catalyst.

7. An apparatus comprising:

a diesel engine having an exhaust pipe;

$NO_x$ catalyst disposed in the exhaust pipe;

means for supplying hydrocarbons into the exhaust pipe as hydrocarbons for reduction so that $NO_x$ exhausted from said diesel engine can be reduced and purified by the $NO_x$ catalyst disposed in the exhaust pipe;

a rotational speed sensor, for measuring a rotational speed of said diesel engine;

a load sensor, for detecting a load on said diesel engine;

means for determining an amount of hydrocarbons in exhaust gas from said $NO_x$ catalyst; and deterioration detecting means for determining an operating condition of the diesel engine on a basis of signals from the rotational speed sensor and the load sensor, and for determining an extent of deterioration of the $NO_x$ catalyst on a basis of a change in the amount of hydrocarbons in the exhaust gas from the $NO_x$ catalyst during a period of time when the operating condition meets a predetermined condition, wherein said means for determining an amount of hydrocarbons in exhaust gas from said $NO_x$ catalyst comprises:

an oxidation catalyst, disposed in the exhaust pipe downstream of and at a predetermined distance from the $NO_x$ catalyst;

a first temperature sensor located in the exhaust pipe upstream of the oxidation catalyst and disposed between the $NO_x$ catalyst and the oxidation catalyst; and a second temperature sensor located in the exhaust pipe downstream of the oxidation catalyst; and wherein said deterioration detecting means calculates a difference between temperatures at said first and second temperature sensors determined from the operating condition of the diesel engine at a time when a variation of the operating condition is judged to be held within a predetermined range over a predetermined time, and compares a thus calculated difference with an actual difference between temperatures detected by said first and second temperature sensors, to determine the extent of deterioration of the $NO_x$ catalyst.

8. Apparatus in accordance with claim 7, wherein said means for supplying hydrocarbons comprises a reducer fuel supplying nozzle, provided in the exhaust pipe at a location between the diesel engine and the $NO_x$ catalyst; and wherein said deterioration detecting means outputs an instruction to increase an additive amount of a reducer fuel supplied to the $NO_x$ catalyst through said reducer fuel supplying nozzle when detecting deterioration of said $NO_x$ catalyst.

9. A method of detecting deterioration of an $NO_x$ catalyst for a diesel engine in which a hydrocarbon is supplied into an exhaust pipe as a hydrocarbon for reduction, and $NO_x$ exhausted from said diesel engine is reduced and purified by the $NO_x$ catalyst disposed in the exhaust pipe; said method comprising the steps of:

determining an operating condition of the diesel engine; and determining an extent of deterioration of the $NO_x$ catalyst on a basis of a change in an amount of hydrocarbon in exhaust gas from said $NO_x$ catalyst during a period of time when the operating condition meets a predetermined condition, wherein said step of determining an operating condition comprises:

determining an operating condition of the diesel engine on a basis of a rotational speed of said diesel engine and a load on said diesel engine, and wherein said step of determining an extent of deterioration comprises the steps of:

measuring an amount of hydrocarbon by a hydrocarbon sensor in the exhaust pipe downstream of the $NO_x$ catalyst;

memorizing an amount of hydrocarbon initially measured as a base amount of hydrocarbon; and comparing a predetermined value with a difference between the base amount of hydrocarbon and an amount of hydrocarbon subsequently measured to determine the extent of deterioration of the $NO_x$ catalyst.

10. A method in accordance with claim 9, further comprising the steps of:

supplying an additive amount of hydrocarbon to the $NO_x$ catalyst through a reducer fuel supplying nozzle which is provided in the exhaust pipe at a location between said diesel engine and the $NO_x$ catalyst; and increasing said additive amount when detecting deterioration of said $NO_x$ catalyst.

11. A method of detecting deterioration of an $NO_x$ catalyst for a diesel engine in which a hydrocarbon is supplied into an exhaust pipe as a hydrocarbon for reduction, and $NO_x$ exhausted from said diesel engine is reduced and purified by the $NO_x$ catalyst disposed in the exhaust pipe; said method comprising the steps of:

determining an operating condition of the diesel engine; and determining an extent of deterioration of the $NO_x$ catalyst on a basis of a change in an amount of hydrocarbon in exhaust gas from said $NO_x$ catalyst during a period of time when the operating condition meets a predetermined condition, wherein said step of determining an operating condition comprises:

determining an operating condition of the diesel engine on a basis of a rotational speed of said diesel engine and a load on said diesel engine, and wherein said step of determining an extent of deterioration comprises:

measuring an amount of hydrocarbon actually exhausted from said $NO_x$ catalyst;

calculating an amount of hydrocarbon exhausted from said $NO_x$ catalyst based on the operating condition of the diesel engine at a time when a variation of the operating condition is judged to be held within a predetermined range over a predetermined time; and comparing a predetermined value with a difference between thus calculated amount of hydrocarbon and thus measured amount of hydrocarbon, to determine the extent of deterioration of the $NO_x$ catalyst.

12. A method in accordance with claim 11, further comprising the steps of:

supplying an additive amount of hydrocarbon to the $NO_x$ catalyst through a reducer fuel supplying nozzle which is provided in the exhaust pipe at a location between said diesel engine and the $NO_x$ catalyst; and increasing said additive amount when detecting deterioration of said $NO_x$ catalyst.

13. A method of detecting deterioration of an $NO_x$ catalyst for a diesel engine in which a hydrocarbon is supplied into an exhaust pipe as a hydrocarbon for reduction, and $NO_x$ exhausted from said diesel engine is reduced and purified by the $NO_x$ catalyst disposed in the exhaust pipe; said method comprising the steps of:

determining an operating condition of the diesel engine; and determining an extent of deterioration of the $NO_x$ catalyst on a basis of a change in an amount of hydrocarbon in exhaust gas from said $NO_x$ catalyst during a period of time when the operating condition meets a predetermined condition, wherein said step of determining an extent of deterioration comprises:

measuring a temperature on an upstream side of an oxidation catalyst which is disposed in said exhaust pipe downstream of and at a predetermined distance from the $NO_x$ catalyst;

measuring a temperature on a downstream side of said oxidation catalyst;

determining an operating condition of the diesel engine; and determining the extent of deterioration of the $NO_0$ catalyst on a basis of a change in temperature difference between said temperature on a downstream side and said temperature on an upsstream side during a period of time when thus determined operating condition meets a predetermined condition.

14. A method in accordance with claim 13, further comprising the steps of:

supplying an additive amount of hydrocarbon to the $NO_x$ catalyst through a reducer fuel supplying nozzle which is provided in the exhaust pipe at a location between said diesel engine and the $NO_x$ catalyst; and increasing said additive amount when detecting deterioration of said $NO_x$ catalyst.

15. A method of detecting deterioration of an $NO_x$ catalyst for a diesel engine in which a hydrocarbon is supplied into an exhaust pipe as a hydrocarbon for reduction, and $NO_x$ exhausted from said diesel engine is reduced and purified by the $NO_x$ catalyst disposed in the exhaust pipe; said method comprising the steps of:

determining an operating condition of the diesel engine; and determining an extent of deterioration of the $NO_x$ catalyst on a basis of a change in an amount of hydrocarbon in exhaust gas from said $NO_x$ catalyst during a period of time when the operating condition meets a predetermined condition, wherein said step of determining an extent of deterioration comprises:

determining an operating condition of the diesel engine;

measuring a temperature on an upstream side of an oxidation catalyst which is disposed in said exhaust pipe downstream of and at a predetermined distance from the $NO_x$ catalyst;

measuring a temperature on a downstream side of said oxidation catalyst;

calculating a difference between said temperature on an upstream side and said temperature on a downstream side based on thus determined operating condition of the diesel engine at a time when a variation of the operating condition is judged to be held within a predetermined range over a predetermined time; and comparing thus calculated temperature difference with an actual difference between said temperature on an upstream side and said temperature on a downstream side, to determine the extent of deterioration of the $NO_x$ catalyst.

16. A method in accordance with claim 15, further comprising the steps of:

supplying an additive amount of hydrocarbon to the $NO_x$ catalyst through a reducer fuel supplying nozzle which is provided in the exhaust pipe at a location between said diesel engine and the $NO_x$ catalyst; and increasing said additive amount when detecting deterioration of said $NO_x$ catalyst.

* * * * *

UNITED STATES PATENT AND TRADEMARK OFFICE
CERTIFICATE OF CORRECTION

PATENT NO. : 6,079,203  
DATED : June 27, 2000  
INVENTOR(S) : Koutarou Wakamoto Page 1 of 1

It is certified that error appears in the above-identified patent and that said Letters Patent is hereby corrected as shown below:

Column 15,  
Line 46, (claim 13, line 24), delete "$NO_o$", and insert -- $NO_x$ --.  
Line 49, (claim 13, line 27), delete "upsstream", and insert -- upstream --.

Signed and Sealed this

Eighteenth Day of September, 2001

Attest:

NICHOLAS P. GODICI  
*Acting Director of the United States Patent and Trademark Office*

*Attesting Officer*